US012632048B2

(12) United States Patent 
Bageshwar et al.

(10) Patent No.: US 12,632,048 B2 
(45) Date of Patent: May 19, 2026

(54) METHODOLOGY TO PROVIDE ASSURANCE OF DATA ASSOCIATION IN NAVIGATION AND RADAR SYSTEMS

(71) Applicant: Honeywell International Inc., Charlotte, NC (US)

(72) Inventors: Vibhor L. Bageshwar, Rosemount, MN (US); Anitha Murugesan, Maple Grove, MN (US)

(73) Assignee: Honeywell International Inc., Charlotte, NC (US)

( * ) Notice: Subject to any disclaimer, the term of this patent is extended or adjusted under 35 U.S.C. 154(b) by 291 days.

(21) Appl. No.: 18/473,889

(22) Filed: Sep. 25, 2023

(65) Prior Publication Data

US 2025/0103045 A1 Mar. 27, 2025

(51) Int. Cl.
G05D 1/00 (2024.01)
G05D 1/10 (2006.01)
(52) U.S. Cl.
CPC ......... G05D 1/0094 (2013.01); G05D 1/0088 (2013.01); G05D 1/101 (2013.01)
(58) Field of Classification Search
CPC .... G05D 1/0094; G05D 1/0088; G05D 1/101; G01S 13/781; G01S 13/867; G01S 13/60; G01S 13/86; G01S 13/933; G01S 13/87; G01S 13/874; G01S 13/726
See application file for complete search history.

(56) References Cited

U.S. PATENT DOCUMENTS

| | | | |
|---|---|---|---|
| 8,965,682 B2 | 2/2015 | Tangirala et al. | |
| 9,507,020 B2 | 11/2016 | Bageshwar et al. | |
| 2010/0002077 A1* | 1/2010 | Viggiano | G08G 5/51 348/169 |

(Continued)

FOREIGN PATENT DOCUMENTS

| | | | |
|---|---|---|---|
| CN | 109656271 A | 4/2019 | |
| CN | 111767639 A * | 10/2020 | G06F 30/20 |

(Continued)

OTHER PUBLICATIONS

Machine Translation: CN-111767639-A (Year: 2020).*

(Continued)

*Primary Examiner* — Anne Marie Antonucci
*Assistant Examiner* — Connor L Knight
(74) *Attorney, Agent, or Firm* — Fogg & Powers LLC

(57) ABSTRACT

A method for providing assurance of data association comprises formulating a track permutation matrix of measurement statistics based on sensor measurement returns and receiving a first set of correlated tracks from a correlator module (set a), identified as originating from a target. A second set of correlated tracks from the track permutation matrix (set b) is selected, based on branching and bounding techniques. The method reframes verification of a data association framework into a linear inequality, with a first portion based on set a, and a second portion based on set b. The method performs a verification procedure to determine whether properties of set a are bounded by properties of set b. If properties of the correlated tracks within set a are (Continued)

bounded by, or are less than or equal to, properties of the correlated tracks within set b, then the correlated tracks are verified.

16 Claims, 5 Drawing Sheets

(56) References Cited

U.S. PATENT DOCUMENTS

| | | | |
|---|---|---|---|
| 2016/0033276 A1* | 2/2016 | Bageshwar | G01S 13/867 |
| | | | 702/150 |
| 2018/0267544 A1* | 9/2018 | Lee | G01S 13/931 |
| 2018/0283895 A1 | 10/2018 | Aikin | |
| 2020/0034351 A1 | 1/2020 | Matsugatani et al. | |
| 2023/0036411 A1 | 2/2023 | Bageshwar et al. | |
| 2025/0026371 A1* | 1/2025 | Andert | B60W 60/001 |

FOREIGN PATENT DOCUMENTS

| | | | | |
|---|---|---|---|---|
| CN | 112362042 A | 2/2021 | | |
| EP | 3367124 A1* | 8/2018 | | G01S 13/933 |
| EP | 3404443 A1 | 11/2018 | | |
| EP | 4296993 A1 | 12/2023 | | |

OTHER PUBLICATIONS

European Patent Office, "Extended European Search Report", dated Dec. 20, 2024, from EP Application No. 24197972.3, from Foreign Counterpart to U.S. Appl. No. 18/473,889, pp. 1 through 15, Published: EP.

Bageshwar et al., "Detect and Avoid Tracking Architecture", U.S. Appl. No. 17/846,899, filed Jun. 22, 2022, pp. 1 through 44, Published: US.

Butler et al., "Formal Verification of Conflict Detection Algorithms", CHARME 2001: 403-417.

Kalandros et al., "Tutorial on Multisensor Management and Fusion Algorithms for Target Tracking", Proceeding of the 2004 American Control Conference, Boston, Massachusetts, Jun. 30-Jul. 2, 2004, pp. 4734 through 4748.

Li et al., "Survey of Maneuvering Target Tracking. Part I: Dynamic Models", IEEE Transactions on Aerospace and Electronic Systems, vol. 39, No. 4, Oct. 2003, pp. 1333 through 1364.

Smith et al., "Approaches to Multisensor Data Fusion in Target Tracking: A Survey", IEEE Transactions on Knowledge and Data Engineering, vol. 18, No. 12, Dec. 2006, pp. 1696 through 1710.

\* cited by examiner

200

Epoch
210

Epoch
220

Epoch
230

1

C

E

2

D

F

| Track Permutation Matrix | | | | |
|---|---|---|---|---|
| Epoch 1 | Epoch 2 | Epoch 3 | Epoch 3 | Epoch 3 |
| 1 | 1 | 1 | 2 | C |
| 2 | 1C | 1C | 2C | CE |
| | 1D | 1CE | 2CE | CF |
| | 1CD | 1CF | 2CF | CEF |
| | 2 | 1CEF | 2CEF | D |
| | 2C | 1D | 2D | DE |
| | 2D | 1DE | 2DE | DF |
| | 2CD | 1DF | 2DF | DEF |
| | C | 1DEF | 2DEF | E |
| | D | 1CDEF | 2CDEF | F |
| | CD | 1E | 2E | EF |
| | | 1F | 2F | Confirmed Tracks |
| | | 1EF | 2EF | Tentative Tracks |

400

410

416

418

Measurement
Returns

Ownship
Navigation
Statistics

Format
Measurements
Unit

Correlator
Unit

Format
Track Output
Statistics
Unit

Measurement
Tracks

Target/
Feature Motion
Classifier

Relative
Target/
Feature Motion
Model

Sensor
Lever
Arms

412

414

METHODOLOGY TO PROVIDE ASSURANCE OF DATA ASSOCIATION IN NAVIGATION AND RADAR SYSTEMS

BACKGROUND

Data or feature association is a key component of navigation systems that use vision-based sensors, or detect and avoid (DAA) systems that use non-cooperative surveillance sensors such as radars or cameras. For vision aided navigation systems, data association is used to identify the same features in consecutive measurement frames to enable the navigation system to compute the vehicle kinematic state statistics such as position, velocity, or angular orientation. In DAA systems, data association, at the sensor level, is used to identify sequences of measurements that originate from the same target. Also, in DAA systems, data association, at the system level, is used to identify measurements from different sensors that originate from the same target.

The performance of the navigation system or tracking system is highly dependent upon the correctness of the correlation performed by the data association algorithms. Hence, it is crucial to assure the correctness of these data association algorithms with high confidence. The most rigorous approach to assure software systems in a way they can be certified is using formal methods-based verification. To date, formal methods have only been used to assure linear systems as, the complexity of the behaviors defined by non-linear systems, such as data association algorithms (namely, their statistical properties and non-linear dynamics), makes them unsuitable for formal-verification approaches without substantial abstraction/simplification.

Currently, in the avionics domain, testing and simulation are the most commonly used methods to gain some confidence in data association implementations, but these methods are insufficient to guarantee the correctness of the association. Some prior research efforts have attempted to define abstractions of such algorithms in formal notations and prove high-level properties using theorem provers. However, such approaches are not scalable to analyze full-scale models or implementations of such algorithms without abstractions.

SUMMARY

A system comprises at least one processor onboard a vehicle, and a plurality of sensors in operative communication with the at least one processor, the sensors comprising at least one non-cooperative sensor. The at least one processor is configured to host a correlator module that operatively communicates with the sensors, with the correlator module configured to receive measurement returns from the at least one non-cooperative sensor, and to output correlated tracks based on the measurement returns; and a verification module in operative communication with the plurality of sensors and the correlator module, with the verification module configured to receive the measurement returns and the correlated tracks. The verification module includes program instructions, executable by the at least one processor, to perform a method comprising: formulating a track permutation matrix of measurement statistics based on the measurement returns; receiving a first set of correlated tracks from the correlator module (set a), which are identified as originating from at least one target; selecting a second set of correlated tracks from the track permutation matrix (set b), based on branching and bounding techniques; reframing verification of a data association framework into a linear inequality, with a first portion of the linear inequality based on the set a, and a second portion of the linear inequality based on the set b; and performing a formal methods-based verification procedure to determine whether properties of the set a are bounded by properties of the set b. If properties of the correlated tracks within the set a are bounded by, or are less than or equal to, properties of the correlated tracks within the set b, then the correlated tracks from the correlator module are verified. If properties of the correlated tracks within the set a are not bounded by, or are not less than or equal to, properties of the correlated tracks within the set b, then the correlated tracks from the correlator module are not verified and are deleted.

BRIEF DESCRIPTION OF THE DRAWINGS

Features of the present invention will become apparent to those skilled in the art from the following description with reference to the drawings. Understanding that the drawings depict only typical embodiments and are not therefore to be considered limiting in scope, the invention will be described with additional specificity and detail through the use of the accompanying drawings, in which.

DETAILED DESCRIPTION

Figure 1A:
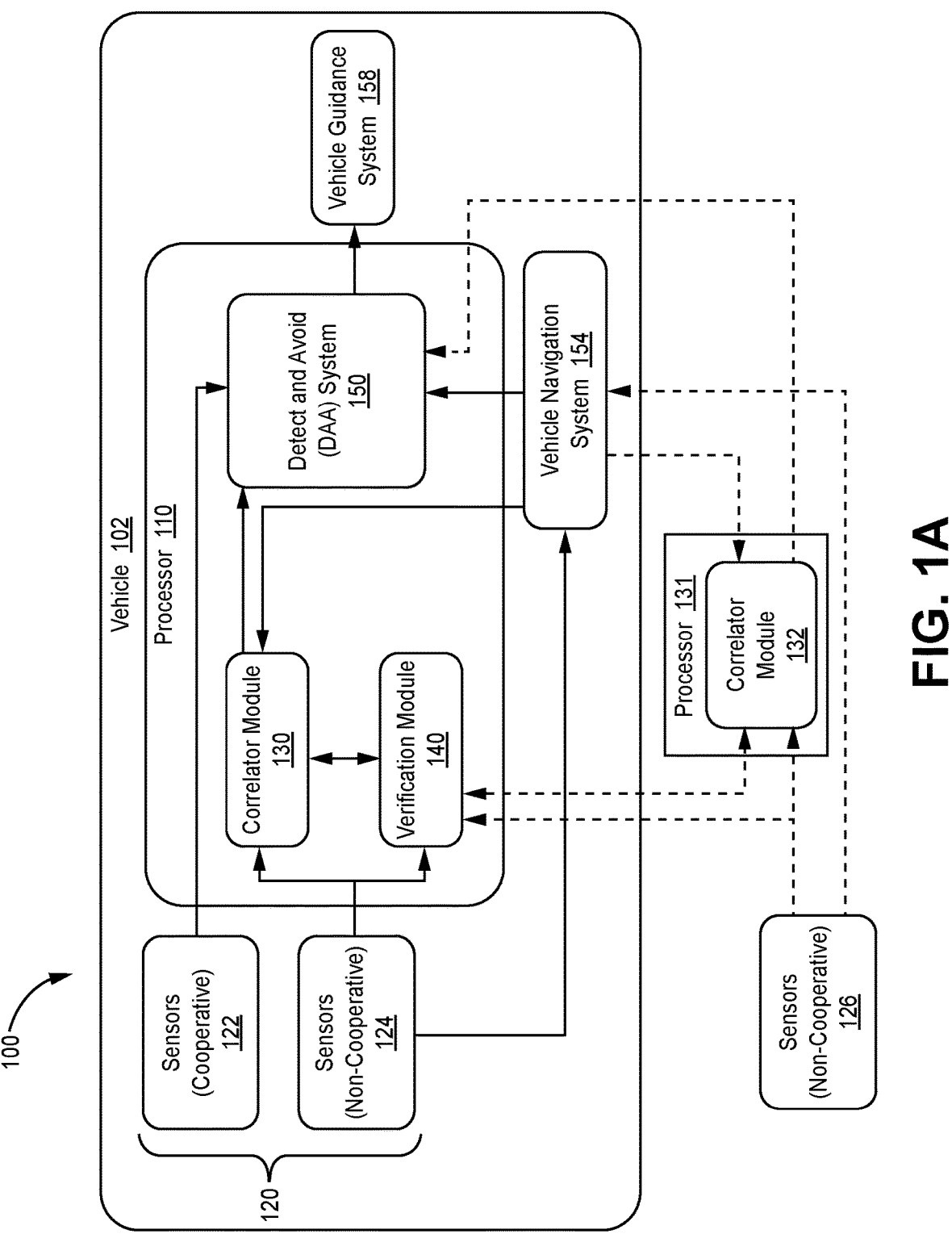
FIG. 1A is a block diagram of a system for providing assurance of data association during vehicle navigation, according to one embodiment.

In the following detailed description, embodiments are described in sufficient detail to enable those skilled in the art to practice the invention. It is to be understood that other embodiments may be utilized without departing from the scope of the invention. The following detailed description is, therefore, not to be taken in a limiting sense.

Systems and methods to provide assurance of data association in navigation and radar systems are described herein.

The present approach applies formal methods to assure stationary feature/moving object correlation. The formal methods include tools that provide pathways for guaranteeing outcomes for linear systems. The present approach reframes the inherently non-linear feature correlation problem into a linear inequality suitable for the application of formal methods.

The present approach addresses a technology gap in the lack of providing guarantees of correct feature associations computed by data association algorithms. The application of formal methods to data association problems provides a pathway for certification of vision-based navigation systems and DAA systems.

In the present approach, a formal methods framework is developed using the outputs of a data association algorithm, re-writing the verification tests as affine inequalities, and developing performance guarantees using the affine inequality. This approach enables the formal methods approach to be extended to non-linear systems and, therefore, data association algorithms in general. This formal methods framework satisfies a major deficiency in assuring the integrity of systems that use data association.

The present approach provides formal verification and generally operates to: reframe a feature association problem as a linear inequality; formulate a complete track permutation matrix that accounts for all possible tracks; determine a suitable subset of tracks from the track permutation matrix using efficient search methods such as branch and bound based on kinematic equations; define the verification objective as a synchronous observer to the correlator system that checks if the track output of the correlator is always within the suitable subset of tracks; and perform formal verification and observe the results. If the results are true, then this is proof of correctness of the tracks from the correlator. If the results are false, then the tracks output from the correlator are not verified and are deleted. In this formal verification approach, the synchronous observer is an adjunct to a system that monitors its inputs and outputs with the aim of constantly verifying whether the intended behavioral properties of the system (expressed in terms of the inputs and outputs) are satisfied, while preserving the system's original behavior intact. This approach offers a mathematically substantiated proof of correctness that serves as a rigorous assurance component for certification of a system by a regulatory authority.

Various benefits of the present approach include: generating formal assurance of feature correlator functionality for navigation and DAA systems; providing a pathway to assure integrity for the data/feature association; and providing a pathway for certification arguments to regulatory agencies. For DAA systems at the sensor level, the present approach assures the integrity of the data association that the correlator software uses to generate measurement tracks, which can then be used in certification arguments to regulatory agencies. A similar, formal methods approach can be extended to other systems, such as map-based vision navigation systems or DAA systems that rely on data association.

The present techniques can be implemented in software to assure feature correlator correctness, and provide a pathway to assure the measurement associations performed over time originate from the same target (e.g., intruder aircraft). The present methodology is used to apply formal methods to the feature correlation problem by defining verification objectives as synchronous-observers of the correlator. The verification objectives include mathematical formulations that delineate desired behavioral properties of the correlator which must be satisfied. For instance, the distance between consecutive correlator output tracks from the correlator are never more than a user-selected threshold.

In a data association implementation, the correlator for non-cooperative DAA surveillance sensors receives measurements from the sensors (that detect targets), and determines if sequences of consecutive measurements originate from the same target. The present approach is used to formally verify and assure that the measurement associations performed over time indeed originate from the same target, in other words, verify the correctness of the association performed by the correlator.

The present approach reframes the data association framework into a linear inequality suitable to apply formal methods: a≤b; where a≡set of tracks from the correlator, b≡set of most likely tracks (selected from all measurement combinations from the start of an encounter scenario). The approach mathematically formulates set b using all the measurement returns from the start of the encounter scenario. From the start of the encounter between a target and an ownship aircraft, which is defined for a finite time horizon, a complete track permutation matrix is defined that enumerates all possible sequences of associations of the target relative to the ownship aircraft. In the track permutation matrix, the most likely sequences of measurements are identified using kinematic models describing the relative motion between the target and ownship aircraft using all the measurement returns from the start of the encounter scenario. The method leverages the target (relative) motion to branch and bound the measurement combinations and to select the set of most likely tracks, set b, for use by the synchronous observer to the correlator. The method uses a model checking approach to exhaustively verify if correlated tracks (set a) from the correlator are within a set of most likely tracks (set b). A successful verification result guarantees that the sequences of measurement returns identified as originating from the same targets by the data association algorithm are correct and serves as a rigorous proof of correctness that can be presented at the time of certification.

The present techniques provide metrics that assure measurements are correctly identified as originating from the same target. In particular, the use of formal method techniques to specify and verify the measurement associations provides assurance that the association was performed correctly and meets association requirements.

The present approach uses formal methods to assure the integrity of the data association algorithms used by the correlator to generate measurement tracks for DAA applications. While the correlator algorithms are non-linear, the data association algorithms that determine whether a measurement return originates from a target can be expressed using simple expressions: a≤b. In this expression, set a refers to the three-dimensional (3D) position estimates of the measurement tracks computed by the correlator and identified as originating from the same target over time, and set b refers to combinations of the 3D position measurement returns, or the measurement mean vector, of the target buffered by added tolerance for sensor errors. Applying formal methods to data association involves mathematically capturing the definition of set a and set b so that they can be used as properties for verification.

In one implementation, a set b includes the 3D positions of a target where each position is augmented by a function of the sensor measurement errors that enables sensor performance to be included in the definition of target position. A set b uses the differences between two target position measurements, either at the same measurement time or consecutive measurement times, as well as relative vehicle kinematic models, to determine whether the measurements likely originate from the same target. The set b is incorporated into the establishment of a correctness property for the correlator that is then subject to formal verification. This property requires that certain attributes of the correlator computed track (set a) should always be within (≤) the respective attributes of the selected tracks in set b. A successful formal verification result of a≤b affirms that measurements indeed originate from the same target, and a negative result of a>b denotes that the measurements do not originate from the same target.

Further details regarding the present system and method are described as follows and with reference to the drawings.

FIG. 1A illustrates a system 100 for providing assurance of the data association performed during DAA, according to one embodiment. The system 100 generally comprises at least one processor 110 onboard a vehicle 102, and a plurality of onboard sensors 120 in operative communication with processor 110. In addition, one or more offboard sensors 126 can be in operative communication with vehicle 102. The vehicle 102 can be an uncrewed aircraft systems (UAS) vehicle, urban air mobility (UAM) vehicle, or other like aircraft.

The onboard sensors 120 can include one or more cooperative sensors 122, and one or more non-cooperative sensors 124. The cooperative sensors 122 are operative to provide measurement tracks for one or more targets in an environment around vehicle 102, with each respective measurement track including a track identifier (ID). Examples of cooperative sensors 122 include Automatic Dependent Surveillance-Broadcast (ADS-B) sensors, and Traffic Collision Avoidance System (TCAS) Mode-S sensors. The non-cooperative sensors 124 can include sensors that provide measurement tracks originating from the same target, while providing inconsistent, changing IDs of the tracks; sensors that provide multiple measurement tracks with consistent IDs for a target, but provide the multiple measurement tracks at a single measurement epoch for the same target; or sensors that provide measurement returns of a target with no measurement correlation or IDs. Examples of non-cooperative sensors 124 include air based radars, onboard vision sensors (e.g., electrooptical cameras or infrared cameras), or other like sensors. When present, the one or more offboard sensors 126 can include one or more non-cooperative surveillance sensors such as a ground based radar.

The processor 110 hosts a correlator module 130 that operatively communicates with non-cooperative sensors 124. The correlator module 130 is configured to receive measurement returns from sensors 124, and to output correlated tracks based on the measurement returns.

The processor 110 also hosts a verification module 140 that operatively communicates with sensors 124 and correlator module 130. The verification module 140 is configured to receive the measurement returns from sensors 124 and the correlated tracks from correlator module 130. The verification module 140 includes program instructions, executable by processor 110 to perform a method for providing assurance of data association, which is described in further detail hereafter and shown in FIG. 1B.

In some embodiments, an offboard processor 131 hosts a correlator module 132 that operatively communicates with offboard sensors 126. The correlator module 132 is configured to receive measurement returns from sensors 126, and to output correlated tracks based on the measurement returns. The verification module 140 is also configured to receive the measurement returns from sensors 126 and the correlated tracks from correlator module 132.

The system 100 can further comprise a DAA system 150 hosted by processor 110. The DAA system 150 is configured to receive verified, correlated tracks from correlator module 130 and correlator module 132 (when present). The DAA system 150 is also configured to receive measurement tracks from cooperative sensors 122.

An onboard vehicle navigation system 154 is in operative communication with DAA system 150, with non-cooperative sensors 124, and with correlator module 130. In some embodiments, vehicle navigation system 154 is also in operative communication with offboard sensors 126, and with correlator module 132.

The vehicle navigation system 154 is operative to calculate a navigation solution for vehicle 102. The DAA system 150 is operative to fuse the verified correlated tracks to thereby estimate an optimal track for at least one target (e.g., intruder aircraft). The optimal track is used by DAA system 150 to provide guidance commands to an onboard vehicle guidance system 158 to ensure that vehicle 102 remains well clear of other air traffic.

Figure 1B:
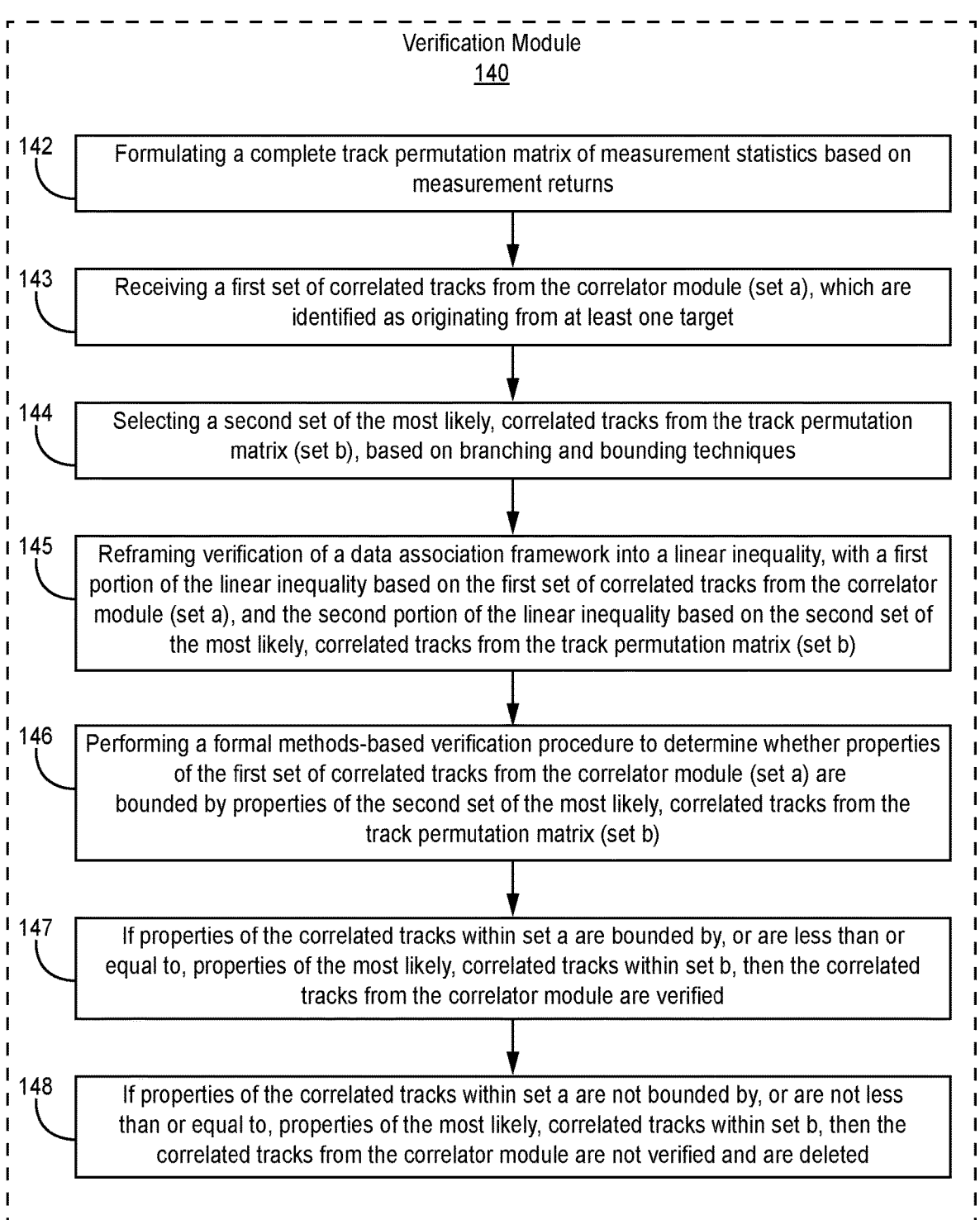
FIG. 1B is a flow diagram of a method for providing assurance of data association, which is performed in the system of FIG. 1A, according to an example implementation.

As mentioned above, verification module 140 includes program instructions to perform a method for providing assurance of data association, which is illustrated in the flow diagram of FIG. 1B. This method comprises formulating a complete track permutation matrix of measurement statistics based on the measurement returns (block 142) from the start of the encounter scenario; receiving a first set of correlated tracks from the correlator module (set a), which are identified as originating from at least one target (block 143); and selecting a second set of the most likely, correlated tracks from the track permutation matrix (set b), based on branching and bounding techniques (block 144). The method then performs reframing verification of a data association framework into a linear inequality, with a first portion of the linear inequality based on the first set of correlated tracks from the correlator module (set a), and the second portion of the linear inequality based on the second set of the most likely, correlated tracks from the track permutation matrix (set b) (block 145). The method performs a formal methods-based verification procedure to determine whether properties of the first set of correlated tracks from the correlator module (set a) are bounded by properties of the second set of the most likely, correlated tracks from the track permutation matrix (set b) (block 146). If properties of the correlated tracks within set a are bounded by, or are less than or equal to, properties of the most likely, correlated tracks within set b, then the correlated tracks from the correlator module are verified (block 147). If properties of the correlated tracks within set a are not bounded by, or are not less than or equal to, properties of the most likely, correlated tracks within set b, then the correlated tracks from the correlator module are not verified and are deleted (block 148).

For example, the properties of the sets a and b along with the thresholds utilized in the verification procedure to assess the closeness of the sets are established per the specific vehicle type within the relevant domain. This is mathematically formulated as a verification objective that functions as a synchronous observer to the correlator and subsequently subject to formal verification. Through an exhaustive analysis of the correlator's state space, the formal verification procedure ascertains the absence of potential violations of the verification objective. In other words, if properties of the correlated tracks within set a are bounded by, or are less than or equal to, properties of the most likely correlated tracks within set b, then the correlated tracks are verified.

The approach to applying formal methods-based verification to assure the correctness of associating features based on the set of scalar expressions a≤b has various tasks. These include using data association to cluster these target position measurements, to filter the clustered measurements, and to generate the inputs for set a. These also include formally defining the data association, that is, specifying the notion of correctness of set b or, more specifically, identifying the most likely, correlated tracks from the track permutation matrix. This is provided by a threshold for which measurement combinations can be clustered. The sensors provide multiple measurement returns of the same target and different targets at each measurement time, or epoch. The formal methods-based verification involves capturing the formal specification in the notations supported for property verification, and performing verification of the correlator.

Further details regarding the present approach are described as follows.

Linear Inequality for Feature Correlation

In reframing the data/feature association framework into a linear inequality suitable to apply formal methods: $a \leq b$, where:

a≡set of correlated tracks, and b≡set of most likely tracks (selected from all measurement combinations from the start of an encounter scenario), the formal verification approach is operative to identify and assure set b.

For set a, the correlated tracks are provided by the correlator, and identified as originating from the same target. Sequences of measurements are identified using a relative motion model such as white noise models, Markov process models, or Semi-Markov jump process models, such as described in Li et al., "*Survey of Maneuvering Target Tracking. Part I: Dynamic Models*, IEEE Transactions on Aerospace and Electronic Systems, Vol. 39, No. 4, pp. 1333-1364 (2003); an association algorithm such as nearest neighbor, joint probabilistic data association, or multiple hypothesis testing, such as described in Smith et al., *Approaches to Multisensor Data Fusion in Target Tracking: A Survey*, IEEE Transactions on Knowledge and Data Engineering, Vol. 18, No. 12, pp. 1696-1710 (2006), and Kalandros et al., *Tutorial on Multisensor Management and Fusion Algorithms for Target Tracking*, Proceedings of the 2004 American Control Conference, Boston, Massachusetts, pp. 1-15 (2004); and measurement returns from the current epoch. The disclosures of the Li et al paper, the Smith et al. paper, and the Kalandros et al. paper are incorporated herein by reference. At each measurement epoch, the correlator outputs one track for each in-view target including the target's track statistics such as the mean and variance computed from the measurement returns.

For set b, the most likely, correlated tracks are selected from the track permutation matrix. Sequences of measurements are identified using a relative vehicle kinematic model of higher order than the model used by the correlator such as coordinated turn models using all the measurement returns from the start of the encounter scenario. Then, from the track permutation matrix, the possible measurement combinations from the start of the encounter scenario are narrowed down by branching and bounding the measurement combinations by leveraging the target's motion relative to the ownship aircraft, geometric representations (to account for sensor errors), and other factors such as infeasible conditions, limits, or the like.

Track Permutation Matrix

Figures 2, 3:
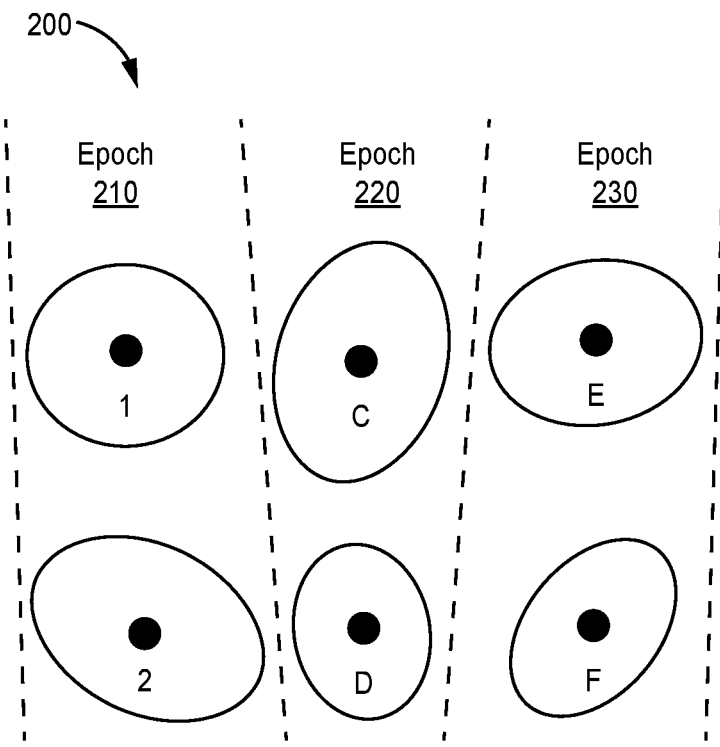
FIG. 2 illustrates an example sensor measurement scenario, in which the system of FIG. 1A can operate.
FIG. 3 depicts a track permutation matrix based on the sensor measurement scenario of FIG. 2.

FIG. 2 illustrates an example sensor measurement scenario 200, in which the present system can operate. At a first time epoch 210, there are two measurement tracks (1 and 2). At a second time epoch 220, there are two measurement returns (C and D). At a third time epoch 230, there are two other measurement returns (E and F). The measurement statistics include a mean and variance. The data association and branch and bound techniques need to operate on all of the measurement statistics provided by the sensor.

FIG. 3 depicts a track permutation matrix based on sensor measurement scenario 200 of FIG. 2. As shown, the number of permutations becomes unwieldy with two measurement returns even after three epochs. The set b described above needs to be identified and assured from the track permutation matrix. Using branch and bound approaches that leverage relative motion kinematic equations, account for outliers, and eliminate infeasible measurement permutations, a subset of tracks, set b, is selected from the track permutation matrix.

Correlator

The correlator is configured to provide measurement tracks for the DAA system. The correlator uses surveillance sensors to provide measurement tracks, and can limit the computation time for the DAA processor if it is located on the sensor's processor and the sensor is located on the ownship aircraft. A sensor measurement track is a sequence of measurement returns originating from the same target (e.g., intruder aircraft with an International Civil Aviation Organization (ICAO) identification number (ID), or unique sensor specific ID).

The sensors used in the present system can include cooperative sensors, such as Automatic Dependent Surveillance-Broadcast (ADS-B) sensors, or active surveillance sensors (e.g., Traffic Collision Avoidance System (TCAS) Mode-S sensors). These sensors provide ICAO IDs to accompany measurement tracks. The sensors can also be non-cooperative sensors, such as an air based radar, an onboard vision sensor (e.g., camera), or a ground based radar. For an offboard sensor, such as a ground based radar, the correlator can be hosted in a DAA processor. The correlator is operative to generate sensor measurement tracks with sensor specific IDs.

In general, the correlator identifies a sequence of measurements originating from the same target over multiple time epochs. The correlator associates and statistically fuses multiple returns originating from the same target at the same time epoch so that there is one measurement track per target at each time epoch. The correlator is also configured to merge multiple measurement returns of the same target at a particular time epoch. The correlator has a coasting function, which enables measurement tracks to coast through sensor scan pattern strategies. For example, measurement returns from an intruder aircraft are provided asynchronously. The coasting function also maintains tracks when the sensor misses detections, such as if there is insufficient power on the target. The correlator assigns an ID to the sequence of sensor measurements; identifies an unknown number of targets in a sensor field of view; and rejects false measurements, which can be false measurement returns or spurious measurement returns. The correlator can use range rate measurements to assist with data association when available. The correlator is also configured to predict measurement locations of current tracks to associate with current measurement returns. While the correlator is not designed to smooth tracks, some level of smoothing is inevitable.

Figure 4:
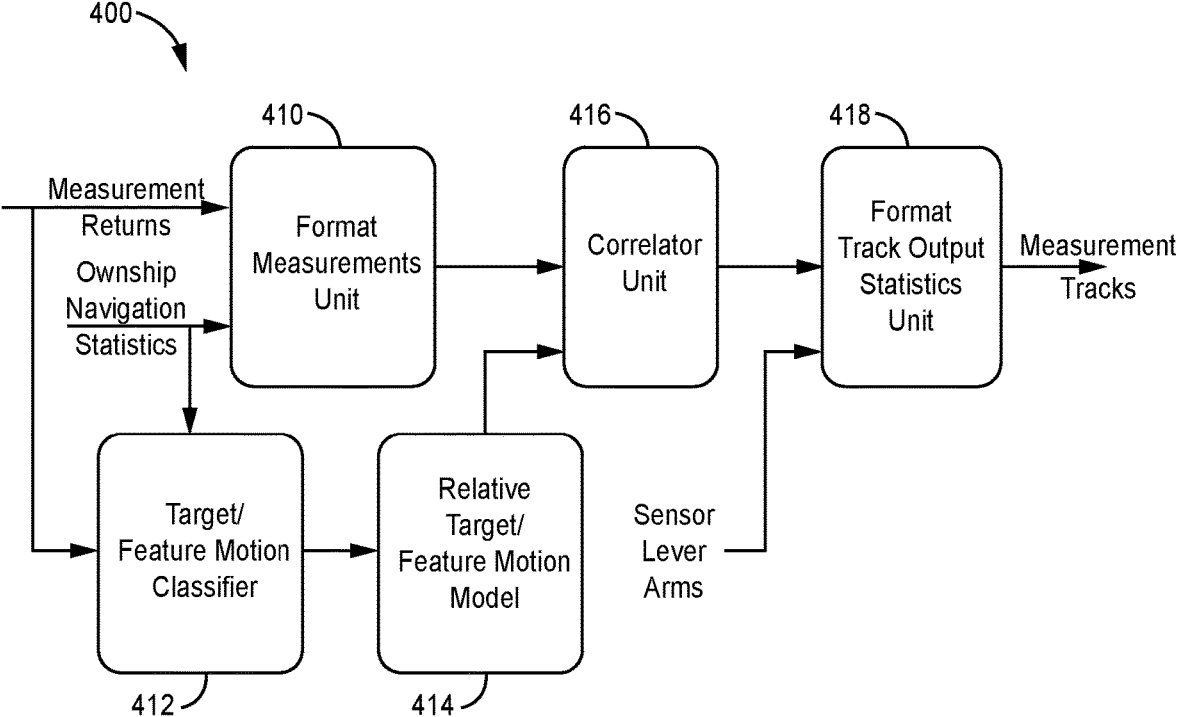
FIG. 4 is a block diagram of a correlator system, according to one embodiment, which can be employed in the system of FIG. 1A.

FIG. 4 is a block diagram of a correlator system 400, according to one embodiment, which can be employed in the present system. The correlator system 400 generally includes a format measurements unit 410 and a target/feature motion classifier 412, which are both configured to receive sensor measurement returns and ownship vehicle navigation statistics. A relative target/feature motion model 414 is responsive to an output from target/feature motion classifier 412. A correlator unit 416 is responsive to outputs from format measurements unit 410 and relative target/feature motion model 414. A format track output statistics unit 418 is responsive to an output from correlator unit 416 and is configured to receive sensor lever arms. The format track output statistics unit 418 is operative to output measurement tracks for use by a DAA system. The various components of correlator system 400 are described in further detail as follows.

The format measurements unit 410 is operative to use the ownship vehicle navigation statistics to resolve the received measurement returns into a correlation reference frame specific for a given sensor. The target/feature motion classifier 412 is operative to classify items measured by vision based sensors as moving or stationary for low-altitude operations. The target/feature motion classifier 412 is configured to use the ownship vehicle navigation statistics to resolve the measurement returns into a correlation reference frame specific for the non-cooperative sensors—the same frame used by the format measurements unit 410. For vision sensors, the target/feature motion classifier 412 then uses dynamic mode decomposition to identify foreground (moving) and background (stationary) targets/features from sequences of vision sensor measurements, or scenes.

The relative target/feature motion model 414 uses relative motion models such as white noise models, Markov process models, or Semi-Markov jump process models. The relative target/feature motion model 414 selects parameters of the vehicle model based on the velocity and altitude of the ownship vehicle, classification of vision sensor measurements into moving objects or targets, or stationary features, and the relative velocity between the targets/features and the ownship vehicle. The ownship vehicle navigation solution provides the velocity and altitude of the ownship vehicle. The relative target/feature motion model 414 selects model parameters based on 1) the velocity and altitude of the ownship vehicle; 2) the velocity of the moving targets or stationary features in the scenes; and 3) the relative velocity of the moving targets or stationary features in the scene.

The correlator unit 416 can be divided into three sub-functions: data association, track management, and correlation filters. The sub-functions are interdependent as they operate together to formulate measurement tracks for downstream systems and users. An exemplary algorithm for the correlator unit is described in further detail in U.S. application Ser. No. 17/846,899, filed Jun. 22, 2022, entitled DETECT AND AVOID TRACKING ARCHITECTURE, the disclosure of which is incorporated by reference herein.

The format track output statistics unit 418 is operative to output the following track statistics in multiple reference frames: track ID; measurement time; object or target relative kinematics statistics resolved in the vehicle's body spherical frame; intruder aircraft range rate and its measurement statistics; air traffic velocities and their measurement statistics resolved in a local horizontal-local vertical reference frame; and validity flags for the various measurements.

Figure 5:
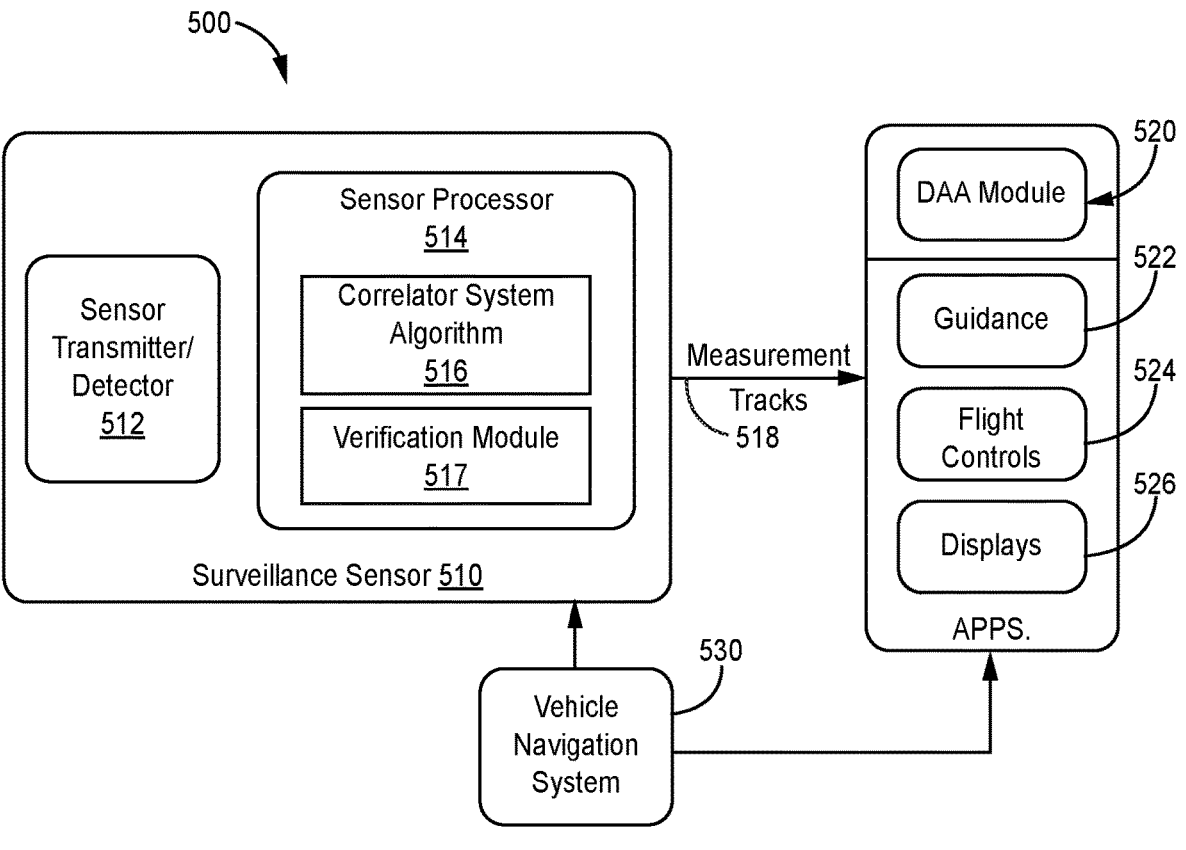
FIG. 5 is a block diagram of a tracking system that employs a correlator system algorithm, according to an alternative embodiment.

In an alternative embodiment, the correlator algorithm and verification module can reside on a sensor processor, so that the correlator functions do not affect DAA functionality or computational resources of the DAA processor. An example implementation of such an embodiment is shown in FIG. 5. There, a DAA tracking system 500 includes at least one surveillance sensor 510 having a sensor transmitter/detector 512, and a sensor processor 514, which hosts a correlator algorithm 516 and a verification module 517. The surveillance sensor 510 operatively communicates with a DAA module 520. A vehicle navigation system 530 operatively communicates with DAA module 520, and with surveillance sensor 510. When an offboard sensor, such as a ground radar, is used with the embodiment of FIG. 5, a correlator for the offboard sensor can be hosted in a DAA processor.

The correlator algorithm 516 processes the sensor measurements from sensor transmitter/detector 512, as well as navigation data from vehicle navigation system 530. The verification module 517 provides a method for assurance of data association for correlator algorithm 516, such as described previously. The correlator algorithm 516 outputs correlated measurement tracks 518, based on the sensor measurements and navigation data, to DAA module 520 for further processing to provide tracking and guidance data to various vehicle applications. Examples of such vehicle applications can include applications for guidance 522, flight controls 524, and displays 526.

A computer or processor used in the present systems and methods can be implemented using software, firmware, hardware, or any appropriate combination thereof, as known to one of skill in the art. These may be supplemented by, or incorporated in, specially-designed application-specific integrated circuits (ASICs) or field programmable gate arrays (FPGAs). The computer or processor can also include functions with software programs, firmware, or other computer readable instructions for carrying out various process tasks, calculations, and control functions used in the present systems and methods.

The present methods can be implemented by computer executable instructions, such as program modules or components, which are executed by at least one processor. Generally, program modules include routines, programs, objects, data components, data structures, algorithms, and the like, which perform particular tasks or implement particular abstract data types.

Instructions for carrying out the various process tasks, calculations, and generation of other data used in the operation of the methods described herein can be implemented in software, firmware, or other computer- or processor-readable instructions. These instructions are typically stored on any appropriate computer program product that includes a computer readable medium used for storage of computer readable instructions or data structures. Such a computer readable medium can be any available media that can be accessed by a general purpose or special purpose computer or processor, or any programmable logic device.

Suitable processor-readable media may include storage or memory media such as magnetic or optical media. For example, storage or memory media may include conventional hard disks, compact discs, DVDs, Blu-ray discs, or other optical storage media; volatile or non-volatile media such as Random Access Memory (RAM); Read Only Memory (ROM), Electrically Erasable Programmable ROM (EEPROM), flash memory, and the like; or any other media that can be used to carry or store desired program code in the form of computer executable instructions or data structures.

EXAMPLE EMBODIMENTS

Example 1 includes a system comprising: at least one processor onboard a vehicle; and a plurality of sensors in operative communication with the at least one processor, the plurality of sensors comprising at least one non-cooperative sensor; wherein the at least one processor is configured to host: a correlator module that operatively communicates with the plurality of sensors, the correlator module configured to receive measurement returns from the at least one non-cooperative sensor, and to output correlated tracks based on the measurement returns; and a verification module in operative communication with the plurality of sensors and the correlator module, the verification module configured to receive the measurement returns and the correlated tracks; wherein the verification module includes program instructions, executable by the at least one processor, to perform a method comprising: formulating a track permutation matrix of measurement statistics based on the measurement returns; receiving a first set of correlated tracks from the correlator module (set a), which are identified as originating from at least one target; selecting a second set of correlated tracks from the track permutation matrix (set b), based on branching and bounding techniques; reframing verification of a data association framework into a linear inequality, with a first portion of the linear inequality based on the set a, and a second portion of the linear inequality based on the set b; and performing a formal methods-based verification proce- dure to determine whether properties of the set a are bounded by properties of the set b; wherein if properties of the correlated tracks within the set a are bounded by, or are less than or equal to, properties of the correlated tracks within the set b, then the correlated tracks from the correla- tor module are verified; wherein if properties of the corre- lated tracks within the set a are not bounded by, or are not less than or equal to, properties of the correlated tracks within the set b, then the correlated tracks from the correla- tor module are not verified and are deleted.

Example 2 includes the system of Example 1, further comprising: a detect and avoid module hosted by the at least one processor, the detect and avoid module configured to receive the verified correlated tracks; and an onboard navi- gation system operative to calculate a navigation solution for the vehicle, the navigation system in operative communica- tion with the detect and avoid module, with the plurality of sensors, and with the correlator module.

Example 3 includes the system of Example 2, further comprising: an onboard vehicle guidance system in opera- tive communication with the detect and avoid module.

Example 4 includes the system of Example 3, wherein the detect and avoid module is operative to fuse the verified correlated tracks to thereby estimate an optimal track for the at least one target, wherein the optimal track is used by the detect and avoid module to provide guidance to the vehicle guidance system to ensure the vehicle remains well clear of other air traffic.

Example 5 includes the system of any of Examples 1-4, wherein the at least one non-cooperative sensor comprises at least one onboard radar, or at least one onboard vision sensor.

Example 6 includes the system of any of Examples 1-5, wherein the at least one non-cooperative sensor comprises at least one ground based radar.

Example 7 includes the system of any of Examples 1-6, wherein the vehicle is an ownship aircraft, and the at least one target is an intruder aircraft.

Example 8 includes the system of any of Examples 1-7, wherein the vehicle is an uncrewed aircraft systems (UAS) vehicle, or an urban air mobility (UAM) vehicle.

Example 9 includes the system of any of Examples 1-8, wherein the correlator module is operative to: identify a sequence of sensor measurement returns that originate from a same target over multiple time epochs; associate and statistically fuse multiple measurement returns that originate from the same target at a same time epoch, so that there is one measurement return per target at each time epoch; assign an identifier (ID) to the sequence of sensor measurement returns; and reject any false measurements, which may be false measurement returns or spurious measurement returns.

Example 10 includes the system of any of Examples 2-9, wherein the correlator module comprises: a format measure- ments unit, and a target/feature motion classifier, which are each configured to receive measurement returns from the at least one non-cooperative sensor, and navigation statistics for the vehicle from the vehicle navigation system; a relative target/feature motion model responsive to an output from the target/feature motion classifier; a correlator unit responsive to outputs from the format measurements unit and the relative target/feature motion model; and a format track output statistics unit responsive to an output from the correlator unit and configured to receive sensor lever arm data; wherein the format track output statistics unit is operative to compute correlated measurement tracks, which are output to the detect and avoid module.

Example 11 includes the system of any of Examples 1-10, wherein the correlator module and the verification module are hosted on an onboard processor that is part of an onboard sensor of the plurality of sensors.

Example 12 includes a method comprising: sending mea- surement returns from at least one surveillance sensor to a correlator, the correlator operative to output correlated tracks based on the measurement returns; and sending the measurement returns and the correlated tracks to a verifica- tion module onboard a vehicle, wherein the verification module is operative to perform a method comprising: for- mulating a track permutation matrix of measurement statis- tics based on the measurement returns; receiving a first set of correlated tracks from the correlator (set a), which are identified as originating from at least one target; selecting a second set of correlated tracks from the track permutation matrix (set b), based on branching and bounding techniques; reframing verification of a data association framework into a linear inequality, with a first portion of the linear inequality based on the set a, and a second portion of the linear inequality based on the set b; and performing a formal methods-based verification procedure to determine whether properties of the set a are bounded by properties of the set b; wherein if properties of the correlated tracks within the set a are bounded by, or are less than or equal to, properties of the correlated tracks within the set b, then the correlated tracks from the correlator are verified; wherein if properties of the correlated tracks within the set a are not bounded by, or are not less than or equal to, properties of the correlated tracks within the set b, then the correlated tracks from the correlator are not verified and are deleted.

Example 13 includes the method of Example 12, further comprising: sending verified correlated tracks from the correlator to an onboard detect and avoid module; wherein the detect and avoid module fuses the verified correlated tracks to thereby estimate an optimal track for the at least one target; wherein the optimal track is used by the detect and avoid module to provide guidance to a vehicle guidance system to ensure the vehicle remains well clear of other air traffic.

Example 14 includes the method of any of Examples 12-13, wherein the at least one surveillance sensor com- prises at least one onboard radar, or at least one onboard vision sensor.

Example 15 includes the method of any of Examples 12-14, wherein the at least one surveillance sensor com- prises at least one ground based radar.

Example 16 includes the method of any of Examples 12-14, wherein the correlator and the verification module are hosted on an onboard processor.

Example 17 includes the method of any of Examples 12-16, wherein the vehicle is an ownship aircraft, and the at least one target is an intruder aircraft.

Example 18 includes the method of any of Examples 12-17, wherein the vehicle is an uncrewed aircraft systems (UAS) vehicle, or an urban air mobility (UAM) vehicle.

Example 19 includes a program product comprising: a non-transitory processor-readable medium including pro- gram instructions, executable by at least one processor, to perform a method of assuring data association, the method comprising: receiving measurement returns from at least one onboard surveillance sensor in an onboard correlator mod- ule, which outputs correlated tracks based on the measurement returns; and receiving the measurement returns and the correlated tracks in an onboard verification module, wherein the verification module performs a process comprising: formulating a track permutation matrix of measurement statistics based on the measurement returns; receiving a first set of correlated tracks from the correlator module (set a), which are identified as originating from at least one target; selecting a second set of correlated tracks from the track permutation matrix (set b), based on branching and bounding techniques; reframing verification of a data association framework into a linear inequality, with a first portion of the linear inequality based on the set a, and a second portion of the linear inequality based on the set b; and performing a formal methods-based verification procedure to determine whether properties of the set a are bounded by properties of the set b; wherein if properties of the correlated tracks within the set a are bounded by, or are less than or equal to, properties of the correlated tracks within the set b, then the correlated tracks from the correlator module are verified; wherein if properties of the correlated tracks within the set a are not bounded by, or are not less than or equal to, properties of the correlated tracks within the set b, then the correlated tracks from the correlator module are not verified and are deleted.

Example 20 includes the program product of Example 19, wherein the non-transitory processor-readable medium includes further program instructions to perform the method comprising: sending verified correlated tracks from the correlator module to an onboard detect and avoid module; wherein the detect and avoid module fuses the verified correlated tracks to thereby estimate an optimal track for the at least one target; wherein the optimal track is used by the detect and avoid module to provide guidance to a vehicle guidance system to ensure the vehicle remains well clear of other air traffic.

From the foregoing, it will be appreciated that, although specific embodiments have been described herein for purposes of illustration, various modifications may be made without deviating from the scope of the disclosure. Thus, the described embodiments are to be considered in all respects only as illustrative and not restrictive. In addition, all changes that come within the meaning and range of equivalency of the claims are to be embraced within their scope.

What is claimed is:

1. A system comprising:

at least one processor onboard a vehicle; and a plurality of sensors in operative communication with the at least one processor, the plurality of sensors comprising at least one non-cooperative sensor;

wherein the at least one processor is configured to host:

a correlator module that operatively communicates with the plurality of sensors, the correlator module configured to receive measurement returns from the at least one non-cooperative sensor, and to output correlated tracks based on the measurement returns; and a verification module in operative communication with the plurality of sensors and the correlator module, the verification module configured to receive the measurement returns and the correlated tracks;

wherein the verification module includes program instructions, executable by the at least one processor, to perform a method comprising:

formulating a track permutation matrix of measurement statistics based on the measurement returns;

receiving a first set of correlated tracks from the correlator module (set a), which are identified as originating from at least one target;

selecting a second set of correlated tracks from the track permutation matrix (set b), based on branching and bounding techniques, which identify sequences of measurements using a relative vehicle kinematic model of higher order than a model used by the correlator module; and performing a verification procedure to determine whether properties of the set a are bounded by properties of the set b based on a result of a linear inequality comprising set a and set b;

wherein if properties of the correlated tracks within the set a are bounded by, or are less than or equal to, properties of the correlated tracks within the set b, then the correlated tracks from the correlator module are verified;

wherein if properties of the correlated tracks within the set a are not bounded by, or are not less than or equal to, properties of the correlated tracks within the set b, then the correlated tracks from the correlator module are not verified and are deleted;

a detect and avoid module hosted by the at least one processor, the detect and avoid module configured to receive the verified correlated tracks; and an onboard vehicle guidance system in operative communication with the detect and avoid module;

wherein the detect and avoid module is operative to fuse the verified correlated tracks to thereby estimate an optimal track for the at least one target, wherein the optimal track is used by the detect and avoid module to provide guidance to the vehicle guidance system, which aids in controlling the vehicle to ensure the vehicle remains clear of other air traffic.

2. The system of claim 1, further comprising:

an onboard navigation system operative to calculate a navigation solution for the vehicle, the navigation system in operative communication with the detect and avoid module, with the plurality of sensors, and with the correlator module.

3. The system of claim 2, wherein the correlator module comprises:

a format measurements unit, and a target/feature motion classifier, which are each configured to receive measurement returns from the at least one non-cooperative sensor, and navigation statistics for the vehicle from the vehicle navigation system;

a relative target/feature motion model in operative communication with the target/feature motion classifier;

a correlator unit in operative communication with the format measurements unit and the relative target/feature motion model; and a format track output statistics unit in operative communication with the correlator unit and configured to receive sensor lever arm data;

wherein the format track output statistics unit is operative to compute correlated measurement tracks, which are output to the detect and avoid module.

4. The system of claim 1, wherein the at least one non-cooperative sensor comprises at least one onboard radar, or at least one onboard vision sensor.

5. The system of claim 1, wherein the at least one non-cooperative sensor comprises at least one ground-based radar.

6. The system of claim 1, wherein the vehicle is an ownship aircraft, and the at least one target is an intruder aircraft.

7. The system of claim 1, wherein the vehicle is an uncrewed aircraft systems (UAS) vehicle, or an urban air mobility (UAM) vehicle.

8. The system of claim 1, wherein the correlator module is operative to:

identify a sequence of sensor measurement returns that originate from a same target over multiple time epochs;

associate and statistically fuse multiple measurement returns that originate from a same target at a same time epoch, so that there is one measurement return per target each time epoch;

assign an identifier (ID) to the sequence of sensor measurement returns; and reject any false measurements, which may be false measurement returns or spurious measurement returns.

9. The system of claim 1, wherein the correlator module and the verification module are hosted on an onboard processor that is part of an onboard sensor of the plurality of sensors.

10. A method comprising:

sending measurement returns from at least one surveillance sensor onboard a vehicle to a correlator onboard the vehicle, the correlator operative to output correlated tracks based on the measurement returns; and sending the measurement returns and the correlated tracks to a verification module onboard the vehicle, wherein the verification module is operative to perform a method comprising:

formulating a track permutation matrix of measurement statistics based on the measurement returns;

receiving a first set of correlated tracks from the correlator (set a), which are identified as originating from at least one target;

selecting a second set of correlated tracks from the track permutation matrix (set b), based on branching and bounding techniques, which identify sequences of measurements using a relative vehicle kinematic model of higher order than a model used by the correlator; and performing a verification procedure to determine whether properties of the set a are bounded by properties of the set b based on a result of a linear inequality comprising set a and set b;

wherein if properties of the correlated tracks within the set a are bounded by, or are less than or equal to, properties of the correlated tracks within the set b, then the correlated tracks from the correlator are verified;

wherein if properties of the correlated tracks within the set a are not bounded by, or are not less than or equal to, properties of the correlated tracks within the set b, then the correlated tracks from the correlator are not verified and are deleted;

sending verified correlated tracks from the correlator to an onboard detect and avoid module, which fuses the verified correlated tracks to thereby estimate an optimal track for the at least one target;

wherein the optimal track is used by the detect and avoid module to provide guidance to a vehicle guidance system, which aids in controlling the vehicle to ensure that the vehicle remains clear of other air traffic.

11. The method of claim 10, wherein the at least one surveillance sensor comprises at least one onboard radar, or at least one onboard vision sensor.

12. The method of claim 10, wherein the at least one surveillance sensor comprises at least one ground-based radar.

13. The method of claim 10, wherein the correlator and the verification module are hosted on an onboard processor.

14. The method of claim 10, wherein the vehicle is an ownship aircraft, and the at least one target is an intruder aircraft.

15. The method of claim 10, wherein the vehicle is an uncrewed aircraft systems (UAS) vehicle, or an urban air mobility (UAM) vehicle.

16. A program product comprising:

a non-transitory processor-readable medium including program instructions, executable by at least one processor, to perform a method of assuring data association, the method comprising:

receiving measurement returns from at least one onboard surveillance sensor in an onboard correlator module, which outputs correlated tracks based on the measurement returns; and receiving the measurement returns and the correlated tracks in an onboard verification module, wherein the verification module performs a process comprising:

formulating a track permutation matrix of measurement statistics based on the measurement returns;

receiving a first set of correlated tracks from the correlator module (set a), which are identified as originating from at least one target;

selecting a second set of correlated tracks from the track permutation matrix (set b), based on branching and bounding techniques, which identify sequences of measurements using a relative vehicle kinematic model of higher order than a model used by the correlator; and performing a verification procedure to determine whether properties of the set a are bounded by properties of the set b based on a result of a linear inequality comprising set a and set b;

wherein if properties of the correlated tracks within the set a are bounded by, or are less than or equal to, properties of the correlated tracks within the set b, then the correlated tracks from the correlator module are verified;

wherein if properties of the correlated tracks within the set a are not bounded by, or are not less than or equal to, properties of the correlated tracks within the set b, then the correlated tracks from the correlator module are not verified and are deleted;

sending verified correlated tracks from the correlator to an onboard detect and avoid module, which fuses the verified correlated tracks to thereby estimate an optimal track for the at least one target;

wherein the optimal track is used by the detect and avoid module to provide guidance to a vehicle guidance system, which aids in controlling the vehicle to ensure that the vehicle remains clear of other air traffic.

* * * * *